United States Patent [19]

Nagase et al.

[11] Patent Number: 5,338,792
[45] Date of Patent: Aug. 16, 1994

[54] HEAT-RESISTANT OVERWRAP FILM FROM 4-METHYL-1-PENTENE AND ISOBUTYLENE AND 1-BUTENE

[75] Inventors: Yasushi Nagase; Masami Kobayashi, both of Onoda; Tatsuo Kato; Shinichi Imuta, both of Kuga, all of Japan

[73] Assignees: Mitsui Petrochemical Industries, Ltd., Tokyo; Chugoku Resin Co., Ltd., Yamaguchi, both of Japan

[21] Appl. No.: 63,761

[22] Filed: May 20, 1993

[30] Foreign Application Priority Data

May 20, 1992 [JP] Japan ................... 4-127089

[51] Int. Cl.$^5$ ........................... C08J 5/10
[52] U.S. Cl. ....................... 524/477; 525/191; 428/411.1
[58] Field of Search ............ 525/86, 240, 191; 428/411.1; 524/477

[56] References Cited

U.S. PATENT DOCUMENTS

| | | | |
|---|---|---|---|
| 4,546,150 | 10/1985 | Shigemoto | 525/240 |
| 4,988,558 | 1/1991 | Shigemoto | 428/213 |
| 5,077,123 | 12/1991 | Shigemoto | 428/349 |

FOREIGN PATENT DOCUMENTS

| | | |
|---|---|---|
| 0139892 | 8/1985 | European Pat. Off. . |
| 0345031 | 6/1989 | European Pat. Off. . |
| 3307946 | 9/1983 | Fed. Rep. of Germany . |
| 2277852 | 6/1976 | France . |
| 2396782 | 2/1979 | France . |

OTHER PUBLICATIONS

Encyclopedia of Polymer Science and Engineering, vol. 7, p. 88, copyright 1987 publ. John Wiley & Sons.

*Primary Examiner*—Paul J. Thibodeau
*Assistant Examiner*—David Abraham
*Attorney, Agent, or Firm*—Sherman and Shalloway

[57] ABSTRACT

The improved heat-resistant overwrap film is formed from a resin composition that comprises (A) 98–70 parts by weight of a 4-methyl-1-pentene based polymer, (B) 1–15 parts by weight of an isobutylene based polymer having a kinematic viscosity of 2–5000 cSt at 100° C., and (C) 1–15 parts by weight of a butene-1 based solid polymer, with the sum of (A)+(B)+(C) being 100 parts by weight. The film is excellent in heat resistance, flexibility, tackiness and transparency.

20 Claims, 1 Drawing Sheet

HEAT-RESISTANT OVERWRAP FILM FROM 4-METHYL-1-PENTENE AND ISOBUTYLENE AND 1-BUTENE

BACKGROUND OF THE INVENTION

This invention relates to a heat-resistant overwrap film, more particularly, to an overwrap film that is improved not only in heat resistance but also in flexibility and tackiness as well.

Overwrap films are currently used as wrappers of foods under storage or cooking. Conventional overwrap films are made of thin films of polyvinyl chloride or polyvinylidene chloride, which are capable of withstanding heat at temperatures of about 140° C.

As the use of overwrap films has expanded recently, a demand has arisen for products that can withstand use at even higher temperatures, namely, those which have higher heat resistance. Polymers based on 4-methyl-1-pentene melt at 220°-240° C. and are known to exhibit high heat resistance. Hence, it is expected that overwrap films having high transparency and heat resistance can be produced by shaping 4-methyl-1-pentene based polymers into films. However, films of 4-methyl-1-pentene based polymers have been unsatisfactory not only in flexibility but also in tackiness which is an important property in the case where they are to be used as wrappers.

SUMMARY OF THE INVENTION

The present invention has been accomplished under these circumstances and has as an object providing a heat-resistant overwrap film that retains the high heat resistance of the 4-methyl-1-pentene based polymers and which also excels in flexibility, tackiness and transparency.

In order to attain this object, the present inventors conducted intensive studies and found that a film formed from a resin composition comprising a 4-methyl-1-pentene based polymer, a butene based liquid polymer and a butene-1 based solid polymer in specified proportions exhibited not only high heat resistance but also good flexibility and tackiness and, hence, were advantageous for use as hear-resistant wrappers. The present invention has been accomplished on the basis of this finding.

Thus, the present invention attains the aforementioned object by providing a heat-resistant overwrap film formed from a resin composition that comprises (A) 98–70 parts by weight of a 4-methyl-1-pentene based polymer, (B) 1–15 parts by weight of a butene based liquid polymer having a kinematic viscosity of 2–5000 cSt at 100° C., and (C) 1–15 parts by weight of a butene-1 based solid polymer, with the sum of (A) +(B)+(C) being 100 parts by weight.

A particularly preferred hear-resistant overwrap film is one having a thickness of 5–20 μm as formed from the resin composition defined above.

DETAILED DESCRIPTION OF THE INVENTION

Figure 1:
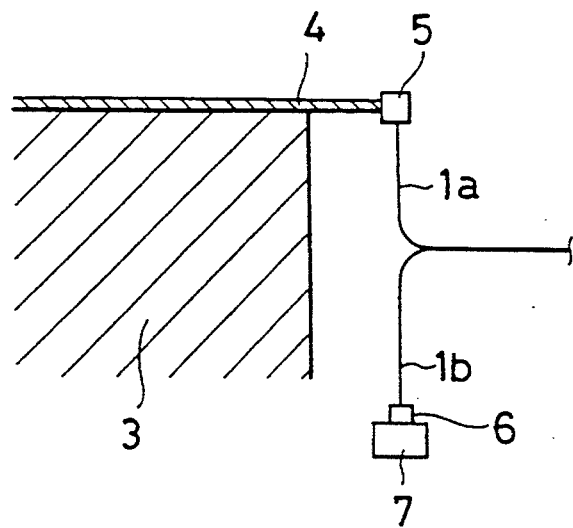
FIG. 1 is a diagram showing conceptually a method of measuring the tack of films prepared in Examples 1–5 and Comparative Examples 1–4.

The heat-resistant overwrap film of the present invention is described below in detail.

Component (A), or 4-methyl-1-pentene based polymer, which is the first essential component of the heat-resistant overwrap film of the present invention is a polymer containing 4-methyl-1-pentene as a principal ingredient and may be exemplified by a homopolymer of 4-methyl-1-pentene, as well as copolymers of 4-methyl-1-pentene and other α-olefins. Exemplary α-olefins other than 4-methyl-1-pentene are α-olefins having 2–20 carbon atoms including ethylene, propylene, 1-butene, 1-heptene, 1-hexene, 1-octene, 1-decene, 1-dodecene, 1-tetradecene, 1-hexadecene, 1-octadecene and 1-eicocene. These α-olefins may be contained either alone or in admixture in the 4-methyl-1-pentene based polymer. When these α-olefins are to be contained in the 4-methyl-1-pentene based polymer, their content is typically in the range from about 1 to 10 wt %.

The intrinsic viscosity $[\eta]$ of the 4-methyl-1-pentene base polymer as measured in the solvent decalin at 135° C. is typically in the range from about 1.0 to about 3.0 dl/g, preferably from about 2.0 to about 2.5 dl/g.

Component (B), or butene based liquid polymer, which is the second essential component of the heat-resistant overwrap film of the present invention is a polymer containing isobutylene as a principal ingredient and may be exemplified by a homopolymer of isobutylene, as well as copolymers that contain a major amount of isobutylene and a minor amount, say, no more than 40 mol %, of other α-olefins. Exemplary α-olefins other than isobutylene include 1-butene, 2-butene and butadiene. These α-olefins may be contained either alone or in admixture in the butene based liquid polymer.

The butene based liquid polymer has a kinematic viscosity of 2–5000 cSt at 100° C.; preferably, this polymer has a kinematic viscosity of 50–1000 cSt since it contributes to the production of heat-resistant overwrap film excellent in moldability and quality.

Component (C), or butene-1 based solid polymer, which is the third essential component of the heat-resistant overwrap film of the present invention is a crystalline polymer containing butene-1 as a principal ingredient and may be exemplified by a homopolymer of butene-1, as well as copolymers of butene-1 and other α-olefins. Exemplary α-olefins other than butene-1 include ethylene and propylene. These α-olefins may be contained either alone or in admixture in the butene-1 based solid polymer. When these α-olefins are to be contained in the butene-1 based solid polymer, their content is typically less than 30 mol %, and the content with 20 mol % or less being particularly preferred. The butene-1 based solid polymer as component (C) can be prepared by polymerizing butene-1 either alone or in combination with other α-olefins in the presence of Ziegler catalyst.

The butene-1 based solid polymer (C) typically has about 20–60% crystallinity, which preferably ranges from about 30 to 50% with a view to insuring substantial effectiveness in providing improved flexibility.

The butene-1 based solid polymer (C) has a melt flow rate of 0.01–50 g/10 min, preferably 0.05–20 g/10 min, in view of providing an overwrap film having satisfactory mechanical strength and producing a highly transparent overwrap film that features good compatibility between the butene-1 based solid polymer (C) and the 4-methyl-l-pentene based polymer (A), The value of melt flow rate as specified in the present invention is measured in accordance with ASTM D 1238E.

The heat-resistant overwrap film of the present invention is produced by molding a resin composition that comprises the above-described 4-methyl-l-pentene based polymer (A), butene based liquid polymer (B) and butene-1 based solid polymer (C).

In order to insure the production of heat-resistant overwrap film that excels in heat resistance, flexibility, tackiness and transparency and which is substantially free from the bleeding of the butene based liquid polymer (B), the relative proportions of the three components (A), (B) and (C) in the resin composition are such that each of the components (B) and (C) is comprised in an amount of 1–15 parts by weight for 98–70 parts by weight of the component (A). In view of insuring the production of a heat-resistant overwrap film that has good balance between tackiness and transparency, each of the components (B) and (C) is contained in an amount of 3–8 parts by weight for 94–84 parts by weight of the component (A). In whichever proportions, the sum of (A)+(B)+(C) is 100 parts by weight.

The resin composition of interest may optionally contain one or more compounding ingredients as selected from among antistats colorants, UV absorbers, inorganic fillers, antistats, antihaze agents and heat stabilizers.

The method of producing the heat-resistant overwrap film of the present invention is in no way limited. In a typical case, the essential components (A), (B) and (C) of the resin composition, as well as any of the compounding ingredients listed above which may be added as required are supplied separately into an extruder in predetermined proportions; alternatively, the individual components and ingredients are preliminarily mixed to prepare the resin composition, which is then supplied into the extruder; in the extruder, the feed is melted and kneaded, followed by extrusion through a suitable molding die such as a T-die or tube die for shaping into a film. The heating temperature in the extruder is typically from 240° to 300° C.

While heat-resistant overwrap films produced in accordance with the present invention in the manner described above, those films which have a post-aging tack of 1–7 g/8 cm and a thickness of 5–20 μm, for example 8–15μm are characterized by good handling property in practice. The term "tack" as used herein means the 180° peel strength of two films and this factor is specifically expressed in terms of the value that is obtained by the method of tack measurement to be described hereinafter.

The heat-resistant overwrap film of the present invention excels in heat resistance, flexibility, tackiness and transparency; hence, it can advantageously be used in high-frequency heating, particularly in those applications where very high heat resistance is required, as exemplified by the reheating and cooking of oil-containing foods.

The following examples and comparative examples are provided for the purpose of further illustrating the present invention but are in no way to be taken as limiting.

Example 1

Ninety parts by weight of poly4-methyl-l-pentene (MX021 of Mitsui Petrochemical Industries, Ltd.), 5 parts by weight of liquid polybutene (B) (HV300 of Nippon Petrochemicals Co., Ltd.; kinematic viscosity, 630 cSt at 100° C.) and 5 parts by weight of polybutene-1 (C-1) (Beaulon M2181 of Mitsui Petrochemical Industries, Ltd.; melt flow rate, 1.0 g/10 min; density, 0.900 g/cm$^3$; m.p. 71° C.) were mixed in a Henschel mixer to prepare a resin composition. The resin composition was then supplied into an extruder, in which it was melted and kneaded at a molding temperature of 290° C. The melt was extruded through a T-die to yield an overwrap film 12 μm thick and 300 mm wide.

The yield strength, breaking strength, elongation, modulus, tear strength, haze, gloss, tack and heat-resisting temperature of the overwrap film thus produced were measured by the methods to be described below and the results are shown in Table 1.

Yield Strength, Breaking Strength and Elongation

Measured in accordance with ASTM D 882.

Tear Strength

Measured in accordance with ASTM D 1992 (Elmendorf tear test).

Haze

Measured in accordance with ASTM D 1003.

Gloss

Measured at 60° in accordance with ASTM D 523.

Tack

Two films 8 cm wide by 10 cm long that had been aged at 40° C. for 1 week after molding were placed in superposition and passed between press rolls at a nip pressure of 0.2 kg/cm$^2$, thereby preparing a test piece in which the two films were held in intimate contact with each other in all areas except a width of 2 cm from one side of the film.

Then, the test piece was set up as shown in FIG. 1 in which it is indicated by 1; and end portion 2 of one film 1a on the side of the test piece 1 where the two films were not held in intimate contact with each other was secured by means of double-coated tape to an end portion 5 of support 4 fixed on a table 3. Furthermore, a load 7 was put on an end portion 6 of the other film 1b on the same side of the test piece 1 (where the two films were not held in intimate contact with each other) in an atmosphere of 23° C.×50% RH. The load was successively replaced by heavier ones until the superposed films 1a and 1b of the test piece 1 separated from each other, whereupon the load 7 to started to move. The weight (in grams/8 cm) of the load applied at that time was measured as the tack of the film.

Heat-Resisting Temperature

Figure 2:
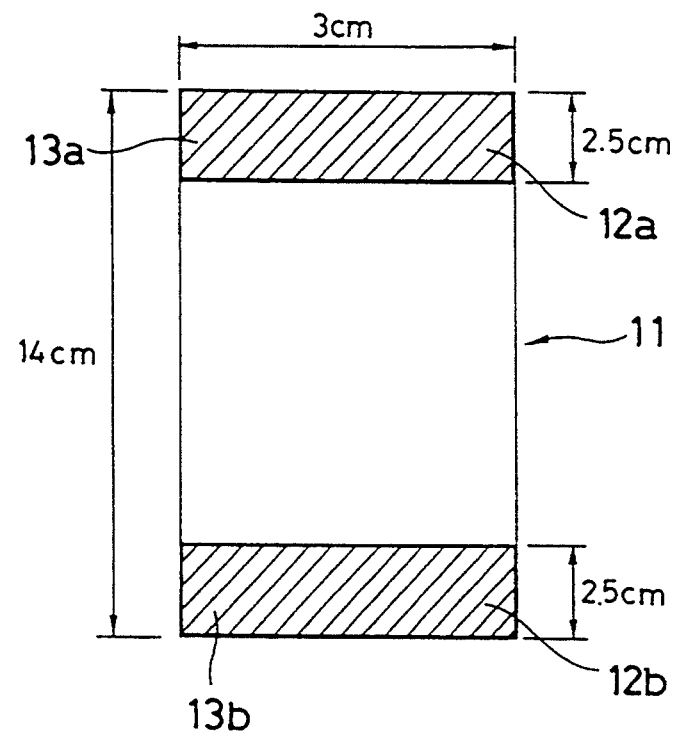
FIG. 2 is a diagram showing the test piece used to measure the hear-resisting temperature of films prepared in Examples 1–5 and Comparative Examples 1.

As shown in FIG. 2, a heat-resistant overwrap film 11 measuring 3 cm wide by 14 cm long was provided and sheets of flat-grained paper 13a and 13b and each measuring 3 cm wide by 2.5 cm long were superposed on an upper end 12a and a lower end 12b, respectively, of the overwrap film 11 and the corresponding members were bonded together with double-coated adhesive tape to prepare a test piece.

The upper end 12a of this test piece was secured to a jig and a load weighing 10 g was applied to the lower end 12b. Immediately after this setup operation, the test piece was put into an air oven and heated with the temperature raised in 5° C. increments at 1-h intervals until the sample broke. The maximum temperature which the sample could withstand without break was designated as the "heat-resisting temperature" of the sample.

Example 2

A heat-resistant overwrap film was prepared by repeating the procedure of Example 1, except that poly4-methyl-l-pentene, liquid polybutene and polybutene-1 (C-1) were mixed in relative proportions of 85, 5 and 10 parts by weight, respectively. The film was measured for its yield strength, breaking strength, elongation, modulus, tear strength, haze, gloss, tack and heat-resisting temperature. The results are shown in Table 1.

Example 3

A heat-resistant overwrap film was prepared by repeating the procedure of Example 1, except that polybutene-1 (C-1) was replaced by polybutene-1 (C-2) (Beaulon M3080 of Mitsui Petrochemical Industries, Ltd.; melt flow rate, 0.2 g/10 min; density, 0.890 g/cm$^3$; m.p. 98° C.). The film was measured for its yield strength, breaking strength, elongation, modulus, tear strength, haze, gloss, tack and heat-resisting temperature. The results are shown in Table 1.

Example 4

A heat-resistant overwrap film was prepared by repeating the procedure of Example 1, except that poly4-methyl-l-pentene, liquid polybutene and polybutene-1 (C-2) which replaced polybutene-1 (C-1) were mixed in relative proportions of 85, 5 and 10 parts by weight, respectively. The film was measured for its yield strength, breaking strength, elongation, modulus, tear strength, haze, gloss, tack and heat-resisting temperature. The results are shown in Table 1.

Example 5

A heat-resistant overwrap film was prepared by repeating the procedure of Example 1, except that poly4-methyl-l-pentene, liquid polybutene and polybutene-1 (C-2) which replaced polybutene-1 (C-1) were mixed in relative proportions of 85, 7 and 8 parts by weight, respectively. The film was measured for its yield strength, breaking strength, elongation, modulus, tear strength, haze, gloss, tack and heat-resisting temperature. The results are shown in Table 1.

Comparative Example 1

A heat-resistant overwrap film was prepared by repeating the procedure of Example 1, except that the resin composition from which the film was molded was replaced by a composition consisting of 90 parts by weight of poly4-methyl-l-pentene and 10 parts by weight of liquid polybutene. The film was measured for its yield strength, breaking strength, elongation, modulus, tear strength, haze, gloss, tack and heat-resisting temperature. The results are shown in Table 1.

TABLE 1-1

| Run No. | Composition poly4-methyl-1-pentene | Composition liquid poly-butene | Composition poly butene-1 | Film thickness ($\mu$m) | Tensile characteristics 2% modulus (kg/cm$^2$) | Tensile characteristics breaking strength (kg/cm$^2$) | Tensile characteristics elongation (%) | Tear strength (kg/cm$^2$) L/T* |
|---|---|---|---|---|---|---|---|---|
| Ex. 1 | Mx021 (90) | HV300 (5) | M2181 (5) | 11.9 | 3249/3420 | 500/227 | 160/570 | 9/9 |
| Ex. 2 | Mx021 (85) | HV300 (5) | M2181 (10) | 13.1 | 3255/3016 | 426/231 | 180/560 | 7/13 |
| Ex. 3 | Mx021 (90) | HV300 (5) | M3080 (5) | 11.4 | 3177/3201 | 491/272 | 180/570 | 15/17 |
| Ex. 4 | Mx021 (85) | HV300 (5) | M3080 (10) | 11.5 | 2898/2895 | 470/233 | 180/550 | 10/14 |
| Ex. 5 | Mx021 (85) | HV300 (7) | M3080 (8) | 11.4 | 2725/2965 | 454/224 | 240/540 | 10/20 |
| Comp. Ex. 1 | Mx021 (90) | HV300 (10) | — | 12.0 | 5481/5615 | 500/284 | 160/480 | 40/27 |

*L = longitudinal direction; T = transverse direction
**All figures in parentheses refer to parts by weight.

TABLE 1-2

| Run No. | Haze/gloss (%) | Tack, g/8 cm (after aging at 40° C. for 1 wk) film (180° peel) | Moldability into film | Surface state of film | Heat-resisting temperature, °C. |
|---|---|---|---|---|---|
| Ex. 1 | 0.3/144 | 1.6 | Good | Good | 190 |
| Ex. 2 | 0.4/143 | 1.6 | Good | Good | 180 |
| Ex. 3 | 0.4/147 | 2.0 | Good | Good | 190 |
| Ex. 4 | 0.3/144 | 3.4 | Good | Good | 180 |
| Ex. 5 | 0.3/144 | 3.6 | Good | Good | 180 |
| Comp. Ex. 1 | 0.4/141 | 1.4 | Good | Good | 190 |

The overwrap film of the present invention excels in heat resistance since it has high heat-resisting temperatures of 190°-195° C. whereas the values for prior art products are in the neighborhood of 140° C. Hence, the overwrap film of this invention can be used in the high-temperature range where conventional overwrap films have been entirely unsuitable for use. Principally for this anticipated expansion of use, the overwrap film of the present invention will offer great benefits in practice.

What is claimed is:

1. A heat-resistant overwrap single layer film formed from a resin composition comprising:
   (A) 98-70 parts by weight of a 4-methyl-1-pentene polymer,
   (B) 1-15 parts by weight of an isobutylene polymer having a kinematic viscosity of 2-5000 cSt at 100° C., and
   (C) 1-15 parts by weight of a butene-1 solid polymer, with the sum of (A)+(B)+(C) being 100 parts by weight.

2. A heat-resistant overwrap film according to claim 1, wherein the film has a thickness of 5-20 $\mu$m as formed from said resin composition.

3. A heat-resistant overwrap film according to claim 1, wherein the 4-methyl-1-pentene based polymer has an intrinsic viscosity (n) in the range from 1.0 to 3.0 dl/g, measured in the solvent decalin at 135° C.

4. A heat-resistant overwrap film according to claim 1, wherein the isobutylene polymer has a kinematic viscosity of 50-1000 cSt.

5. A heat-resistant overwrap film according to claim 1, wherein the butene-1 based solid polymer has 20-60% crystallinity.

6. A heat-resistant overwrap film according to claim 1, wherein the butene-1 based solid polymer has 30-50% crystallinity.

7. A heat-resistant overwrap film according to claim 1, wherein the butene-1 solid polymer has a melt flow rate of 0.01-50 g/10 min.

8. A heat-resistant overwrap film according to claim 1, wherein each of the components (B) and (C) is comprised in an amount of 3-8 parts by weight for 94-84 parts by weight of the component (A).

9. A heat resistant overwrap film formed from a resin composition comprising:
   (A) 98-70 parts by weight of a 4-methyl-1-pentene polymer,
   (B) 1-15 parts by weight of a polymer containing isobutylene and no more than 40 mole % of other α-olefin, which has a kinematic viscosity of 2-5000 cSt at 100° C., and
   (C) 1-15 parts by weight of a butene-1 polymer containing no less than 70 mole % of butene-1, which has a melt flow rate of 0.01-50 g/10 min.
   with the sum of (A)+(B)+(C) being 100 parts by weight.

10. A heat-resistant overwrap film according to claim 9, wherein the film has a thickness of 5-20 μm.

11. A heat-resistant overwrap film according to claim 9, wherein the 4-methyl-1-pentene polymer has an intrinsic viscosity (η) in the range from 1.0 to 3.0 dl/g, measured in the solvent decalin at 135° C.

12. A heat-resistant overwrap film according to claim 9, wherein the butene-1 polymer has 20-60% of crystallinity.

13. A heat-resistant overwrap film according to claim 9, wherein the butene-1 polymer has 30-50% of crystallinity.

14. A heat-resistant overwrap film according to claim 9, wherein each of the component (B) and (C) is comprised in an amount of 3-8 parts by weight for 94-84 parts by weight of the component (A).

15. A heat-resistant overwrap single layer film formed from a resin composition comprising
   (A) 94-84 parts by weight of a 4-methyl-1-pentene polymer containing 1 to 10 wt. %, based on weight of said 4-methyl-1-pentene polymer, of other α-olefin having 2-20 carbon atoms,
   (B) 3-8 parts by weight of isobutylene polymer containing no more than 40 mole % of other α-olefin selected from the group consisting of 1-butene, 2-butene and butadiene, and having a kinematic viscosity of 2-5000 cSt at 100° C., and
   (C) 3-8 parts by weight of a crystalline butene-1 solid polymer containing less than 30 mole % of other α-olefin selected from the group consisting of ethylene and propylene, wherein the polymer has a melt flow rate of 0.01-50 g/10 min with the sum of (A)+(B)+(C) being 100 parts by weight.

16. A heat-resistant overwrap film according to claim 15, wherein the film has a thickness of 5-20 μm as formed from said resin composition.

17. A heat-resistant overwrap film according to claim 15, wherein the 4-methyl-1-pentene based polymer has an intrinsic viscosity (η) in the range from 1.0 to 3.0 dl/g, measured in the solvent decalin at 135° C.

18. A heat-resistant overwrap film according to claim 15, wherein the isobutylene polymer has a kinematic viscosity of 50-1000 cSt.

19. A heat-resistant overwrap film according to claim 15, wherein the butene-1 solid polymer has 20-60% crystallinity.

20. A heat-resistant overwrap film according to claim 15, wherein the butene-1 solid polymer has 30-50% crystallinity.

* * * * *